US008789801B2

(12) United States Patent
Newman (10) Patent No.: US 8,789,801 B2
(45) Date of Patent: Jul. 29, 2014

(54) SELF-LEVELING RECEPTACLE WITH A POSITIONING LOCK

(76) Inventor: Alfred Thomas Newman, Westfield, NY (US)

(*) Notice: Subject to any disclaimer, the term of this patent is extended or adjusted under 35 U.S.C. 154(b) by 109 days.

(21) Appl. No.: 13/372,732

(22) Filed: Feb. 14, 2012

(65) Prior Publication Data

US 2012/0273537 A1 Nov. 1, 2012

Related U.S. Application Data

(60) Provisional application No. 61/517,790, filed on Apr. 26, 2011, provisional application No. 61/519,135, filed on May 17, 2011, provisional application No. 61/571,953, filed on Jul. 9, 2011, provisional application No. 61/626,460, filed on Sep. 27, 2011.

(51) Int. Cl.
*A47F 5/12* (2006.01)
*B25B 1/22* (2006.01)
*G01C 19/04* (2006.01)
*B62B 1/24* (2006.01)

(52) U.S. Cl.
CPC .............. *B62B 1/24* (2013.01); *B62B 2203/04* (2013.01)
USPC ........... 248/133; 248/130; 248/131; 248/138; 248/139; 248/140; 248/141; 248/142; 248/137; 248/184.1; 248/143; 248/144; 248/145.6; 248/284.1; 248/583; 248/292.12; 248/660; 248/661; 269/71; 269/72; 269/73; 74/5 R; 74/5.8

(58) Field of Classification Search
USPC ................ 248/133, 138–142, 128, 129, 137, 248/184.1, 143, 144, 182.1, 145.6, 284.1, 248/278.1, 127, 130, 131, 183.2, 583, 248/292.12, 660, 661; 211/80–81; 269/71–73; 74/5 R, 5.8
See application file for complete search history.

(56) References Cited

U.S. PATENT DOCUMENTS

| | | | | |
|---|---|---|---|---|
| 352,925 | A | * | 11/1886 | Mathews ....................... 222/166 |
| 2,548,204 | A | * | 4/1951 | Drake ............................ 248/133 |
| 3,235,212 | A | * | 2/1966 | Baumiller, Jr. ............... 248/142 |
| 4,093,166 | A | * | 6/1978 | Iida ................................ 248/126 |
| 4,189,946 | A | * | 2/1980 | Hoffman et al. ................. 74/5.4 |
| 5,313,850 | A | * | 5/1994 | Finvold et al. ................... 74/5.9 |
| 5,690,420 | A | * | 11/1997 | Saldana, Sr. ................... 362/540 |
| 5,713,583 | A | | 2/1998 | Hansen |
| 5,758,887 | A | | 6/1998 | Bobst |
| 5,944,896 | A | * | 8/1999 | Landesman et al. .......... 118/500 |
| 6,203,033 | B1 | | 3/2001 | Knoll |
| 6,257,125 | B1 | * | 7/2001 | Pate ................................ 99/339 |
| 6,531,990 | B2 | * | 3/2003 | Verkerk ........................ 343/882 |
| 6,536,724 | B2 | * | 3/2003 | Furuta ......................... 248/183.2 |
| 6,764,051 | B2 | * | 7/2004 | Knight ........................... 248/128 |

(Continued)

*Primary Examiner* — Terrell McKinnon
*Assistant Examiner* — Christopher Garft
(74) *Attorney, Agent, or Firm* — William E. Noonan (57) ABSTRACT

A symmetrical, balanced receptacle for storing, displaying or transporting goods, materials, people, plants or animals is suspended from a double-axis gimbal mounted on a framework. The receptacle is attached to the gimbal by adjustable bearings and a locking mechanism holds the receptacle in various positions, tilted forward or back, and swiveled to one side or the other. When the receptacle is unlocked, gravity holds it level, which is especially useful when the device is used to hold or transport cargo on sloping ground, turbulent water or shifting air currents. The framework may be stationary or attached to a wheeled vehicle, water craft, aircraft or other means of transport.

16 Claims, 5 Drawing Sheets

(56) References Cited

U.S. PATENT DOCUMENTS

| | | |
|---|---|---|
| 7,134,676 B2 | 11/2006 | Capers, Jr. |
| 7,398,980 B2 | 7/2008 | Capers, Jr. et al. |
| 7,547,026 B2 | 6/2009 | Morris |
| 7,934,728 B2 | 5/2011 | Strobel |
| 2002/0130230 A1* | 9/2002 | Ursan et al. ............ 248/184.1 |
| 2010/0225077 A1* | 9/2010 | Plesh et al. ............ 280/47.23 |

* cited by examiner

SELF-LEVELING RECEPTACLE WITH A POSITIONING LOCK

CROSS-REFERENCE TO RELATED APPLICATIONS

This application claims the benefit of U.S. Provisional Patent Application Ser. Nos. 61/517,790 filed Apr. 26, 2011, U.S. Provisional Patent Application Ser. No. 61/519,135 filed May 17, 2011, U.S. Provisional Patent Application Ser. No. 61/571,953 filed Jul. 9, 2011, and U.S. Provisional Patent Application Ser. No. 61/626,460 filed Sep. 27, 2011.

BACKGROUND OF THE INVENTION (1) Field of the Invention

This invention relates generally to devices and vehicles which hold or transport goods, materials, people, plants or animals (hereinafter called "cargo"), and more particularly to devices and vehicles which would be safer and easier to operate and provide greater utility, convenience and comfort by utilizing a balanced, self-leveling, independent receptacle suspended from a double-axis gimbal that can be locked in various positions or unlocked so gravity will level the receptacle. Examples of such devices and vehicles include: hand trucks, wheelbarrows, wagons, carts, trailers, truck beds, farm machinery, wheelchairs, ambulance cots, boat chairs, baby strollers, off-road vehicles, golf carts, display racks, storage bins, tool and implement holders, food bowls, shipping containers, plus other devices yet to be developed.

(2) Description of Related Art

Perhaps the simplest way to understand the function and benefits of this new invention is to know how it would work on a specific application, such as a wheelbarrow. This application will be described and illustrated in detail so the advantages provided by the new invention can be readily visualized and comprehended; not just for its use on a wheelbarrow, but for all the devices previously mentioned.

As is well known, wheelbarrows generally have one or two wheels in front, two straight or contoured handles extending back to the user, an open receptacle supported by and affixed to the handles and two support legs beneath the handles.

When the user lifts the handles of a conventional wheelbarrow, the rear of the receptacle is higher than the front of the receptacle. If the wheelbarrow is used on an uphill or downhill slope, or to traverse diagonally across a slope, the user has to watch the contents of the receptacle and raise or lower the handles to keep the receptacle level; while at the same time try to keep his footing. In those situations, it is difficult to steer and balance the wheelbarrow to avoid spilling its contents, or as is often the case, from tipping the wheelbarrow over completely.

Various inventions have been developed to try to keep a wheelbarrow level on a sloping ground, but none have had a self-leveling receptacle on a double-axis gimbal so the receptacle can tilt forward and back and swivel from side to side, utilizing gravity to keep it level, and a lock to hold the receptacle in a fixed position when desired.

Examples of prior art wheelbarrows and hand trucks are shown in U.S. Pat. No. 7,934,728 B2 to Guye Strobel, showing a two-wheeled wheelbarrow with a rotating axle that allows the wheels to swivel with the slope of the terrain; U.S. Pat. No. 5,758,887 to Glen L. Bobst for a two-wheeled wheelbarrow for added efficiency and stability; U.S. Pat. No. 5,713,583 to Thomas E. Hansen for a water cart for suspension of a water bucket for use in concrete finishing work; U.S. Pat. No. 6,203,033 B1 to Bryce Knoll for a wheelbarrow for transporting four circular buckets; U.S. Pat. No. 7,134,676 B2 and U.S. Pat. No. 7,398,980 B2, both to Seth Murph Capers, Jr., and Seth Murphy Capers, for adjustable leg supports to keep the wheelbarrow level on a slope when parked; U.S. Pat. No. 7,547,026 B2 to Richard J. Morris for a two-wheeled wheelbarrow with an undercarriage that pivots relative to the top portion of the frame.

These patents and others all address the instability and inadequacies of common wheelbarrows. However, they do not show specific elements of the preferred embodiment of a wheelbarrow which utilizes the new invention. Therefore there exists a need in the art for a new and improved wheelbarrow which has: 1) a balanced, self-leveling, independent receptacle suspended from a double-axis gimbal; 2) with said receptacle formed in a balanced, bowl-like shape capable of transporting fluids or other viscous cargoes such as mortar and cement, without tipping and spilling; 3) a supporting framework holding the gimbal and receptacle; 4) a locking mechanism to secure the receptacle in various positions or release it so gravity will level it; 5) a trigger mechanism that allows the user to lock or unlock the receptacle without losing control of the wheelbarrow; 6) adjustable pivot bearings on the gimbal that allow the user to regulate the swinging inertia of the receptacle when it is unlocked; 7) an independent receptacle which can be removed for transport, cleaning and storage, and replaced with other receptacles.

SUMMARY OF THE INVENTION

The general object of the invention is to provide an improved method for holding or transporting cargo by using a balanced, independent receptacle suspended from a double-axis gimbal which has a locking mechanism so the receptacle can be held in various positions, or unlocked to swing freely, allowing gravity to level it.

Another particular object of the present invention is to provide a self-leveling receptacle suspended from a double-axis gimbal mounted on a moving vehicle so the cargo can be held or transported in a level position over sloping ground, turbulent water, shifting air currents, or when the vehicle suddenly changes direction, such as an ambulance speeding thru traffic.

Another particular object of the present invention is to provide the gimbal with adjustable bearings so the user can regulate the swinging inertia of the unlocked receptacle.

Another particular object of the present invention is to provide a control for the lock mechanism that is conveniently located so the user can lock or unlock the receptacle on a moving vehicle without losing control of the vehicle.

Another particular object of the present invention is to provide an independent receptacle which can be easily removed and replaced.

BRIEF DESCRIPTION OF THE DRAWINGS

The objects and features of the present invention, which are believed to be novel, are set forth with particularity in the appended claims. The present invention, both as to its design and manner of operation, together with further objects and advantages, may best be understood by reference to the following descriptions, taken in connection with the accompanying drawings wherein:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a new and improved means to hold and transport cargo in a self-leveling, independent receptacle suspended from a double-axis gimbal, with a locking mechanism to secure the receptacle in various positions. The drawings illustrate the invention as it may be utilized on a stationary base, on a wheelbarrow, on a chair to counter motion sickness, or on a self-leveling support for shipping crates, but any person skilled in the art can understand how the invention can be modified and utilized for a wide variety of devices previously mentioned, as well as new applications not yet conceived.

Figure 1:
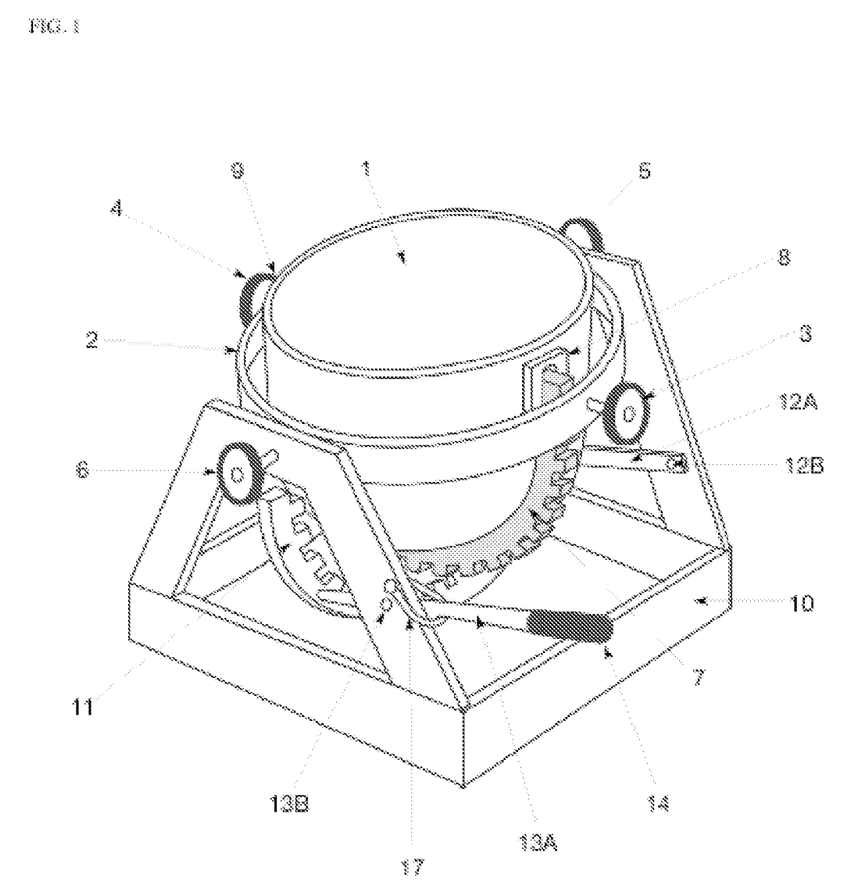
FIG. 1 shows a perspective view of the present invention mounted on a stationary framework.

FIG. 1 shows a perspective view of the new invention on a stationary framework (10) wherein a balanced, bowl-shaped, independent receptacle (1), is suspended from a double-axis gimbal (2). A notched plate (7) (hereinafter called the receptacle plate) is suspended by two adjustable bearings (3) and (4) at the front and back center points of the gimbal. The receptacle has two fittings (8) shown, and (9) not visible, centered on its front and rear face which secure the receptacle to the receptacle plate. The outer edge of the receptacle plate has a convex curvature concentric with the arc defined by the movement of the receptacle as it swings forward and back on the gimbal; the edge has notches cut at radiating angles, at regular, closely spaced intervals.

FIG. 1 also shows that the gimbal is connected to a supporting structure (10) by two adjustable bearings (5) and (6) on the center points of the sides of the gimbal, and a second notched plate (11) hereinafter called the frame plate, is positioned beneath the receptacle plate so the center points of the two plates intersect at a 90 degree angle. The leading edge of the frame plate has a concave curvature concentric to the arc defined by the receptacle as it swivels from side to side; notches are cut at radiating angles, at regular, closely spaced intervals, so they will interlock with the notches on the receptacle plate. The frame plate is attached to the sides of the supporting framework by two levers (12A) and (13A) extending from the plate near each of its ends. These levers are attached at a 90 degree angle to the frame plate and are aligned parallel to the receptacle plate, parallel to ground level and tangent to the center bottom point of the receptacle plate. The end of one of the of the levers (12A) pivots from a bearing (12B) on the supporting framework, while the other lever (13A) attaches to the opposite side of the frame with a spring-loaded bearing (13B), and extends beyond the bearing with a counterweighted handle (14). The spring-loaded bearing and counterweighted handle lift the frame plate so it interlocks with the receptacle plate. A hasp (17) on the handle holds the handle (14) up to keep the plates unlocked when desired.

Figure 2:
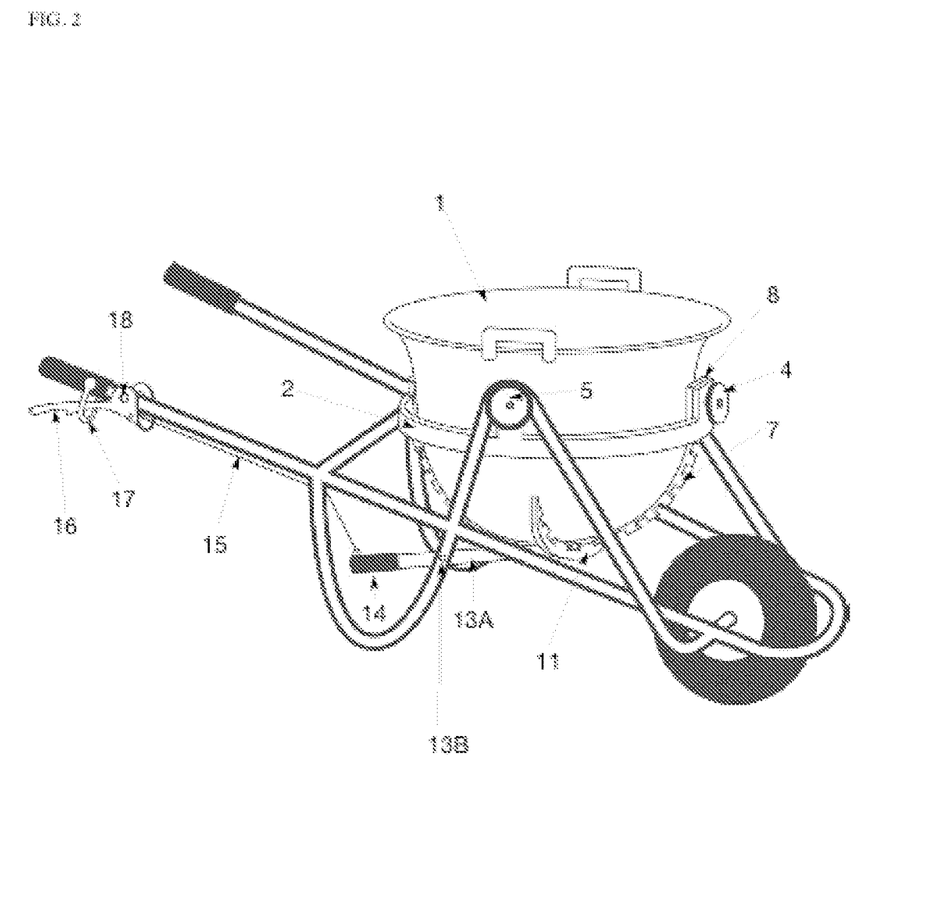
FIG. 2 shows a perspective view of the preferred embodiment on a wheelbarrow.

FIG. 2 is a perspective view of the new invention mounted on a wheelbarrow.

NOTE: This gimbal is designed so the adjustable bearings are raised on four arms reaching up from the gimbal ring; allowing the upper edge of the receptacle to swivel from side to side within normal degrees of rotation without passing by the gimbal and thereby reducing the chance for hands or other objects to get caught or pinched between the gimbal and the edge of the receptacle. This design also allows the user to pour out contents to the forward left or forward right sides of the receptacle as well as straight ahead, without interference from the gimbal.

Figure 3:
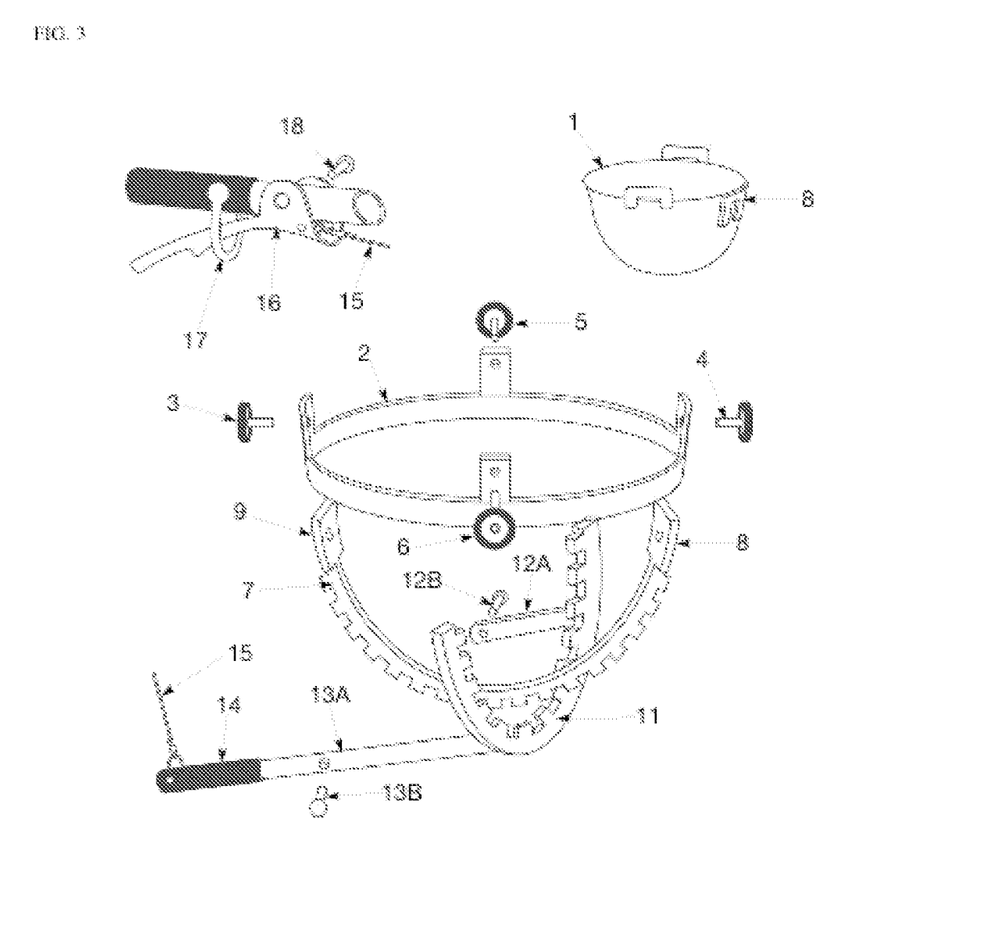
FIG. 3 shows an exploded view of the preferred locking mechanism.

FIG. 3 shows a perspective view of the locking elements of the new invention when it is utilized on a wheelbarrow, wherein a balanced, bowl-shaped, independent receptacle (1), is suspended within a double-axis gimbal (2), with a receptacle plate (7) suspended by two adjustable bearings (3) and (4) on raised arms above the front and back center points of the gimbal. The lock plate has a convex curvature which matches the arc defined by the edge of the receptacle as it pivots forward and back; with notches cut at radiating angles at closely spaced, regular intervals. The receptacle has two fittings (8) and (9) that interlock with the receptacle plate. The gimbal is connected to the wheelbarrow frame, not shown, by two adjustable bearings (5) and (6) on raised arms above the center points on the sides of the gimbal.

FIG. 3 also shows the concave frame plate (11) beneath the receptacle plate. The frame plate has a concave curvature concentric to the arc defined by the movement of the receptacle as it swivels from side to side. Notches are cut along the edge of the frame plate at radiating angles, closely spaced at regular intervals, so these notches will interlock with the notches on the receptacle plate. FIG. 3 also shows the levers (12A) and (13A), which attach the frame plate to the sides of the supporting framework. The levers are connected to the frame plate at a 90 degree angle and are aligned parallel to the receptacle plate, parallel to level ground and tangent to the center bottom point of the receptacle plate. The end of one of the of the levers (12A) pivots from a bearing (12B) on the supporting framework, while the other lever (13A) pivots from a spring-loaded bearing (13B) on the opposite side of the framework and extends beyond the framework with a counterweighted handle (14). This counterweighted handle and the spring-loaded bearing lift the frame plate so it interlocks with the receptacle plate. FIG. 3 also shows the levers (12A) and (12B), which attach the frame plate to the sides of the supporting framework. The levers are connected to the frame plate at a 90 degree angle and are aligned parallel to the receptacle plate, parallel to level ground and tangent to the center bottom point of the receptacle plate. The end of one of the of the levers (12A) pivots from a bearing (13A) on the supporting framework, while the other lever (12B) pivots from a spring-loaded bearing (13B) on the opposite side of the framework and extends beyond the framework with a counterweighted handle (14). This counterweighted handle and the spring-loaded bearing lift the frame plate so it interlocks with the receptacle plate.

FIG. 3 also shows how the counterweighted handle (14) attaches to a cable (15) which connects to the trigger mechanism (16). The trigger, which is mounted on one of the wheelbarrow's handles, has a bearing (18) which connects it to the handle. The cable (15) is attached to the front of the trigger mechanism. When the trigger is closed, the cable pulls the frame plate down, releasing it from the receptacle plate. A pivoting hasp (17) on the wheelbarrow handle holds the trigger in the closed position when the user wants to keep the receptacle unlocked.

Figure 4:
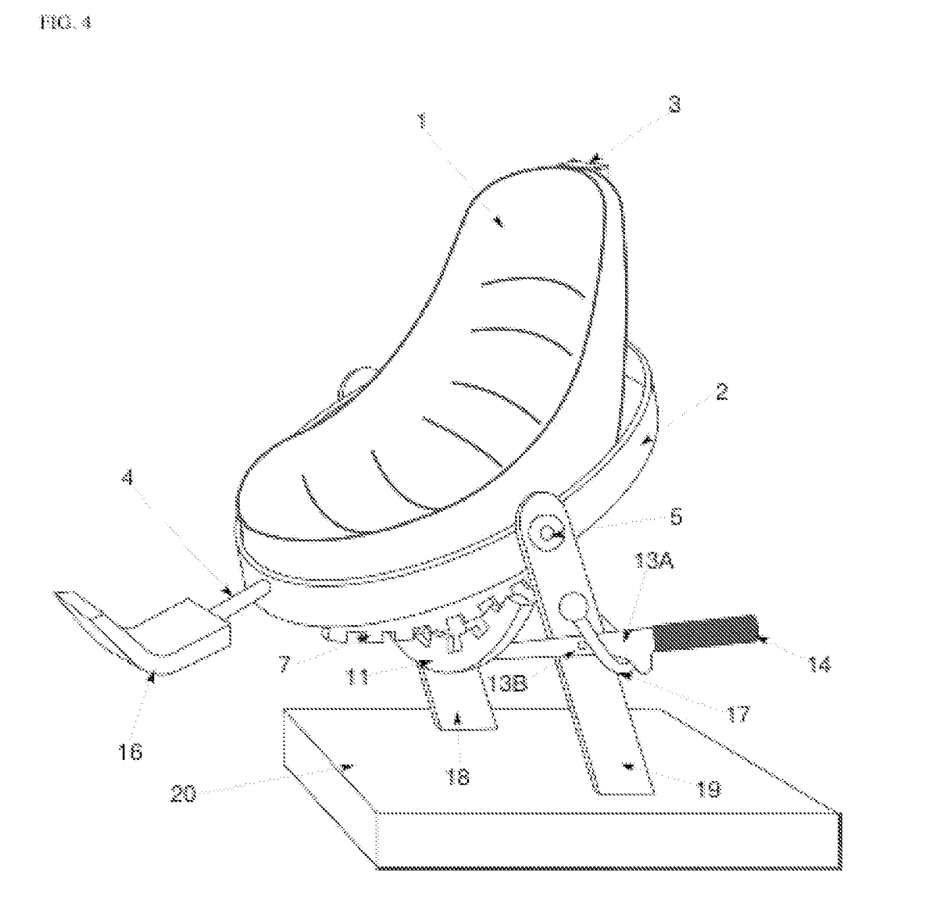
FIG. 4 shows the invention as a self-leveling chair to counter motion sickness.

FIG. 4 shows the new invention as a chair to counter motion sickness. In this design a chair (1) is used as the receptacle.

The chair is weighted so it maintains a vertical position within the gimbal (2) and connects to the gimbal with adjustable bearings in back (3) and front (4). A footrest (16) is attached to the front bearing (4) so it maintains the same attitude as the chair. Beneath the seat of the chair, a receptacle plate (7) is attached along its central axis. Two upright arms (18) and (19) hold the sides of the gimbal (2) with adjustable bearings (5) and (6 not shown). The arms attach to the base (20). Between the arms, a frame plate (11) is suspended by levers (12A not shown), and (13A) at each end of the frame plate which pivot on bearings 12B not shown), and (13B) attached to the upright arms (18 and 19). Gravity pulls down on a weighted handle (14) to hold the frame plate up so it interlocks with the receptacle plate. A hasp (17) holds the handle (14) up so the plates are unlocked, whenever the user wants the chair to ride freely on the gimbal.

Figure 5:
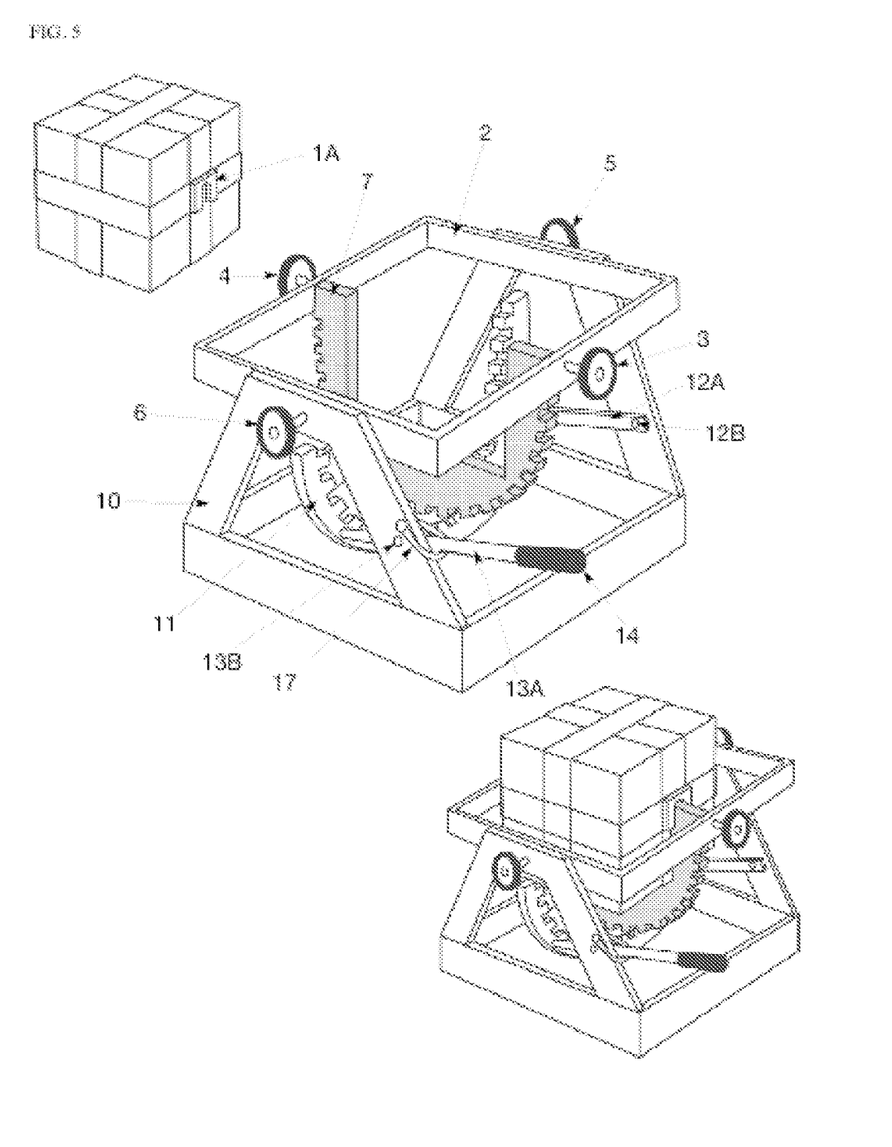
FIG. 5 shows a perspective view of the invention as a support for shipping crates.

FIG. 5 shows a perspective view of the new invention as a stand to hold a shipping crate, wherein two strap-on fittings (1 not shown) and (1A) are secured to opposing sides of the crate and connect the crate to the receptacle plate (7) which pivots on two adjustable bearings (3) and (4) on the gimbal (2). The gimbal pivots on two adjustable bearings (5) and (6) from the upright arms connected to the base framework (10). The frame plate (11) is suspended beneath the receptacle plate at a 90 degree angle and has two levers (12A) and (13A) which attach the plate to the base framework. One lever (13A) has a weighted handle (14) which pulls down to lift the frame plate (11) so it interlocks with the receptacle plate (7). To unlock the plates, the user would lift the handle (14). The plates can be held in the unlocked position by using a hasp (17) to hold the handle up.

DESCRIPTION OF PREFERRED MATERIALS

The materials used for components of the invention may be made of materials with the strength and flexibility to support the loads the device or vehicle is intended to carry.

The adjustable bearings should be made of materials which will withstand all the pressures incurred when the receptacle is loaded and rotating on those bearings.

The receptacle should be formed from material(s) which can be shaped into a symmetrical form that is watertight, rigid and will carry loads without changing shape or losing integrity.

NOTE: While the preferred embodiment of the invention has been described and illustrated, it should be obvious to those skilled in the art that other embodiments and features can be incorporated into different designs. For instance: receptacles without a double-axis gimbal which swivel on side bearings only; folding frames; frames with other configurations; asymmetrical gimbals; off-center bearings; locking mechanisms such as hooks, pins, clamps, or electromagnets; locking mechanisms in different positions, such as above a suspended receptacle; springs in place of the counterweighted handle; receptacles with other shapes and sizes; woven, ventilated, or flexible receptacles; shock absorbers. These various embodiments and others not listed here, may be utilized for different forms of this invention.

What is claimed:

1. A receptacle for holding or transporting goods, materials, people, plants or animals, comprised of a self-leveling, balanced, independent receptacle suspended from a double-axis gimbal that is attached to a supporting framework, with a locking mechanism which allows the receptacle to be held in various positions, or unlocked, so that gravity will level the receptacle; a front and a rear of the receptacle having fittings to attach to a curved, notched receptacle plate which is placed beneath the receptacle and is part of the locking mechanism; the receptacle plate having a convex curvature which matches an arc defined by the movement of the receptacle as it swings forward and back on the gimbal and an edge having notches cut at radiating angles, at regular, closely spaced intervals; the receptacle plate being secured to a front and rear of the double-axis gimbal by two threaded bearings which are adjustable to regulate a swinging inertia of the receptacle; the gimbal being secured to the supporting framework by two threaded bearings which are adjustable to regulate the swinging inertia of the gimbal, the adjustable bearings being placed on raised arms located at the front, back and at each side of the gimbal; and the receptacle further including a curved frame plate having a concave curvature which matches the arc defined by the movement of the receptacle as it swings from side to side on the gimbal and an edge of the frame plate having notches cut at radiating angles, at regular, closely spaced intervals.

2. The self-leveling, balanced, independent receptacle of claim 1 wherein the frame plate is positioned beneath the receptacle plate so it intersects the receptacle plate at 90 degrees, and said frame plate is suspended from sides of the supporting framework by levers attached at each end of the plate.

3. The self-leveling, balanced, independent receptacle of claim 2 wherein the levers attached to the frame plate are parallel to the receptacle plate and tangent to a center bottom point of the receptacle plate.

4. The self-leveling, balanced, independent receptacle of claim 3 wherein an end of one of the levers from the frame plate is attached to a bearing on one side of the framework, while the lever on another side of the frame plate connects to another side of the framework with a bearing, then extends past that bearing and has a weighted handle at its terminus which acts as a counterweight to the frame plate.

5. The self-leveling, balanced, independent receptacle of claim 4 wherein gravity pulls the weighted handle on the end of the lever downward, lifting the attached frame plate so it interlocks with the receptacle plate.

6. The self-leveling, balanced, independent receptacle of claim 5 wherein the weighted handle of the lever is lifted to unlock the receptacle and frame plates; allowing the receptacle to swing freely.

7. The self-leveling, balanced, independent receptacle of claim 6 wherein the weighted handle of the lever is operably attached to a remote trigger which controls the lever.

8. The self leveling, balanced, independent receptacle of claim 7 wherein the device is used on a stationary base.

9. The self leveling, balanced, independent receptacle of claim 7 wherein the device is used on a wheeled vehicle.

10. The self leveling, balanced, independent receptacle of claim 7 wherein the device is used on a boat or other water craft.

11. The self leveling, balanced, independent receptacle of claim 7 wherein the device is used on an aircraft.

12. The self-leveling, balanced, independent receptacle of claim 7 wherein the device is used on a sled, skis, or other form of ground transport without wheels.

13. A receptacle for holding or transporting goods, materials, people, plants or animals, comprised of a self-leveling, balanced, independent receptacle suspended from a double-axis gimbal that is attached to a supporting framework and wherein the axes of the double axis gimbal extend transversely to one another, with a locking mechanism which allows the receptacle to be held in various positions, or unlocked, so gravity will level the receptacle; said locking mechanism further including a receptacle plate having a convex curvature which matches an arc defined by the movement of the receptacle as it swings forward and back on one axis of the gimbal, an edge of the receptacle plate having notches cut at radiating angles at regular, closely spaced intervals; the locking mechanism further including a curved frame plate having a concave curvature which matches the arc defined by the movement of the receptacle as it swings from side to side on the other axis of the gimbal, an edge of the frame plate having notches cut at radiating angles, at regular, closely spaced intervals, a selected notch of the receptacle plate being interlocked with a selected notch of the frame plate to hold the receptacle in a selected position.

14. An apparatus for supporting a receptacle such that the receptacle is self-leveling and selectively lockable in one of a plurality of angular orientations, said apparatus comprising:
   a supportive framework;
   a double axis gimbal attached to said supportive framework for pivoting about a first pivot axis;
   said gimbal for holding the receptacle such that said receptacle is pivotable relative to said gimbal about a second pivot axis that is transverse to said first pivot axis; and
   a locking mechanism which allows the receptacle to be held in various positions, or unlocked, so that gravity will level the receptacle, said locking mechanism including a curved receptacle plate for attaching to the receptacle and having a convex curvature which matches an arc defined by the movement of said gimbal as it pivots about said first pivot axis and a curved frame plate attached to said supportive framework and having a concave curvature which matches the arc defined by the movement of the receptacle as it pivots about said second pivot axis, said frame plate being selectively extended to engage and lock with said receptacle plate and retracted to disengage and unlock from said receptacle plate.

15. The receptacle of claim 13 in which the transverse axes extend perpendicularly to one another.

16. The receptacle of claim 14 in which the first and second axes extend perpendicularly to one another.

* * * * *